United States Patent
Bordes et al.

(10) Patent No.: US 7,711,839 B2
(45) Date of Patent: May 4, 2010

(54) DEVICE AND METHOD FOR THE PREPARATION OF SENDING DATA AND CORRESPONDING PRODUCTS

(75) Inventors: Philippe Bordes, Laille (FR); Philippe Guillotel, Vern sur Seiche (FR); Anne Lorette, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 822 days.

(21) Appl. No.: 10/580,943

(22) PCT Filed: Nov. 26, 2004

(86) PCT No.: PCT/EP2004/053143

§ 371 (c)(1),
(2), (4) Date: May 30, 2006

(87) PCT Pub. No.: WO2005/055553

PCT Pub. Date: Jun. 16, 2005

(65) Prior Publication Data

US 2007/0106813 A1 May 10, 2007

(30) Foreign Application Priority Data

Dec. 1, 2003 (FR) .................................. 03 14076

(51) Int. Cl.
*G06F 15/16* (2006.01)
*G06F 11/00* (2006.01)
*H04N 7/12* (2006.01)
*H04N 7/173* (2006.01)

(52) U.S. Cl. ................... 709/231; 709/235; 370/230.1; 370/235; 370/242; 375/240.27; 375/240.29; 725/87; 725/98

(58) Field of Classification Search ....................... None
See application file for complete search history.

(56) References Cited

U.S. PATENT DOCUMENTS 5,699,365 A * 12/1997 Klayman et al. ............ 714/708

(Continued)

OTHER PUBLICATIONS

Wu et al., "Streaming Video over the Internet: Approaches and Directions", Mar. 3, 2001 (retrieved from http://ieeexplore.ieee.org/stamp/stamp.jsp?arnumber=911156&isnumber=19666 on Feb. 9, 2009).*

(Continued)

*Primary Examiner*—Joon H Hwang
*Assistant Examiner*—Thomas Lee
(74) *Attorney, Agent, or Firm*—Robert D. Shedd; Harvey D. Fried; Joel M. Fogelson

(57) ABSTRACT

The present invention relates to a device and a method for the preparation of data to be sent as a continuous stream via a communication network. The device comprises means for obtainment of the data originating from a database, which contains at least two data stream entities for data associated respectively with different transmission throughputs, means of transfer of these data to a sending system, means of connection to one of these entities, and means of switching of the means of connection from one of the entities to another. The preparation device also comprises means of regular addition to the data transferred, of error correction codes. The means of switching switch from a first entity to a second entity of greater throughput, when this augmented data stream reaches the sum of the sending throughput associated with the second entity and of an additional throughput associated with an initial input of error correction codes of the second entity, and the means of addition reinitialize the addition of the codes to this initial input upon this switching.

11 Claims, 3 Drawing Sheets

U.S. PATENT DOCUMENTS

Figure 1:
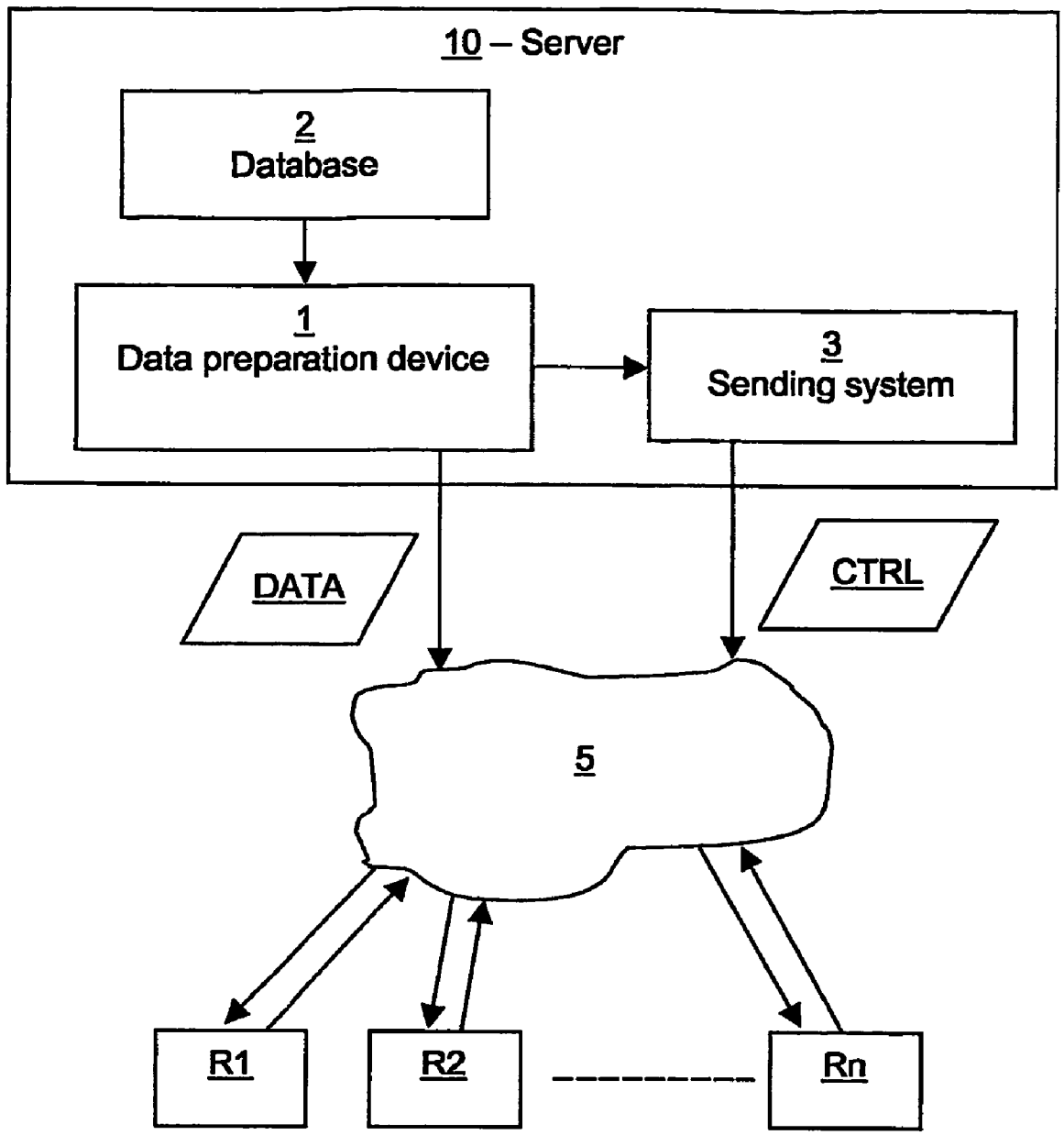

2003/0135631 A1* 7/2003 Li et al. .................. 709/231
2003/0231589 A1* 12/2003 Itoh et al. ................ 370/230
2006/0026294 A1* 2/2006 Virdi et al. ............... 709/232

OTHER PUBLICATIONS

Giancola et al., "A Novel Approach to Error Protection in Medium Access Control Design", Dec. 10, 2002 (retrieved from http://ieeexplore.ieee.org/xpls/abs_all.jsp?arnumber=1045785 on Feb. 9, 2009).*

R. Puri et al: "Forward error correction (FEC) codes based multiple description coding for internet video streaming and multicast", Signal Processing. Image Communication, Elsevier Science Publishers, Amsterdam, NL, vol. 16, No. 8, May 2001, pp. 745-762.

A.E. Mohr et al: "Generalized multiple description coding through unequal loss protection", Image Processing 1999, ICIP 99, Proceedings, 1999 International Conference on Kobe, Japan Oct. 24-28, 1999, Piscataway, NJ USA, IEEE, Oct. 26, 1999, pp. 411-415.

Search Report Dated Jul. 27, 2005.

* cited by examiner

DEVICE AND METHOD FOR THE PREPARATION OF SENDING DATA AND CORRESPONDING PRODUCTS

This application claims the benefit, under 35 U.S.C. §365 of International Application PCT/EP2004/053143, filed Nov. 26, 2004, which was published in accordance with PCT Article 21(2) on Jun. 16, 2005 in English and which claims the benefit of French patent application No. 03 14076, filed Dec. 1, 2003.

1. FIELD OF THE INVENTION

The present invention pertains to a device and a method for the preparation of data to be sent as a continuous stream to at least one receiver via a communication network. It applies in particular to transfer of data as a continuous stream, or "streaming", in particular in respect of audiovisual (multimedia) streams transmitted over IP network (IP standing for a "Internet Protocol"). The invention also pertains to an associated data server and associated computer program.

2. TECHNICAL BACKGROUND

Networks of IP type are based on a grid of interconnected nodes which perform data packet routings, called routers. Such a network is generally exposed to delays, jitter and packet losses, which result from the resources of the routers not being infinite and from the traffic possibly being subject to heavy variations in load. In particular, routers have their capacities restricted by the sizes of FIFO (standing for First In, First Out) memories and the durations of the various processings, such as in particular address resolutions, error corrections and/or retransmissions, checksums and management of network administration protocols (updates of routing tables, quality of service, multicast groups, etc). The resources of the routers are also affected by faults, the existence of which is all the more probable when the number of nodes of the network is high and when the latter is used over a long period.

Another penalizing consequence of this situation is that the applications that use the network employ a bandwidth that turns out to be both limited and highly variable.

Data losses may be partially corrected by verification mechanisms with automatic repetition of errored messages, also called "ARQ" (standing for "Automatic Repeat and Request"), or by adding error correction codes such as in particular error correction codes with no return path, called "FEC" codes (standing for Forward Error Correction). However, these techniques themselves introduce extra delays, further decreasing the available bandwidth.

These difficulties have led to two types of developments, one type pertaining to the sharing of resources between users, and the other type relating to the adaptation of each transmitter to the bandwidth available over time.

As far as the first point is concerned, to be able to equitably share the resources of the network (bandwidth per user) while also limiting packet losses as far as possible, users must follow "fairness" rules. In particular, they must use protocols complying with the principle designated by "AIMD" (Additive Increase, Multiplicative Decrease). According to the latter, a transmitter of content over the network must slowly and linearly raise (at constant stepsize) his sending throughput so long as his estimation of the state of the network so permits, by taking account of the parameters such as: estimation of the value of a loss rate, outward/return duration (or "RTT" standing for "Round Time Trip"), useful throughput (or "goodput"), etc. On the other hand, he must drastically reduce his sending throughput ("Multiplicative Decrease") as soon as a loss has been detected.

The AIMD principle for IP network is integrated into the TCP (standing for "Transmission Control Protocol") communication protocol. However, using a system for acknowledging and retransmitting lost packets, it is generally considered to be unsuited to the transport of audiovisual streams, since it introduces unacceptable delays and does not allow the multicast mode. This is why, for transmission as a continuous stream (streaming), the combined utilization of RTP (standing for "Real Time Transport Protocol") and UDP (standing for "User Datagram Protocol") protocols is preferred to it. However, this involves building an AIMD system onto this transmission technique. In particular, one speaks of "TCP-friendly" regulation (that is to say equitable with respect to TCP) when the throughput used is not larger than that which would have been used by a TCP source under similar conditions.

As far as the second type of developments made to take account of the difficulties of communication over network is concerned, there are traditionally two ways of adapting a video stream to the available bandwidth. The first consists in using a real time coder with an efficient regulation module. It is thus possible to generate on the fly a video stream complying with a throughput preset.

However, such encoders are generally less efficient than so-called "off-line" encoders (non real time). Specifically, the latter may be put in place with coding algorithms capable of employing the desired complexity (since they are not constrained by time) and therefore be much more efficient (better quality of decoded images for the same throughput). The coding algorithms may consist for example of a multipass mode (multipass coding) or of a choice of the type of coding for each block. For similar reasons, an "off-line" coder often complies better with the throughput presets.

The second traditional way of adapting a video stream to the available bandwidth consists in generating a set of streams of the same video, that are coded at different throughputs. The video server then selectively transmits one stream rather than another as a function of a desired throughput preset. As indicated previously, the "off-line" streams possibly being of better quality than the "real timer" streams, this mode of transmission generally affords a better quality of service for the customer.

It is possible to distinguish essentially two branches for the practice of procedures of this type. According to a direct selective transmission technique, called "simulcast" or "stream switching", several versions of one and the same sequence are encoded directly at different throughputs. During a transmission and as a function of the available bandwidth of the connection, one stream rather than another is then dispatched. For example, we have three streams encoded at constant bit rates (CBR mode standing for "Constant Bit Rate" mode), associated respectively with three different throughputs. If at a given instant the second stream is transmitted and packet losses appear, then we switch automatically to the first stream, of lower throughput. If conversely the bandwidth available becomes large enough, we can switch to the third stream, of higher throughput.

According to a second technique of selective transmission, by hierarchization or "scalability", a base layer and one or more extra enhancement layers are provided. These extra layers make it possible to increase the quality of transmission and/or the temporal and/or spatial resolution. Depending on the availability of bandwidth, one or more enhancement layers are thus added to the base layer.

In the industry, it is observed that the various video coding standards of recent years, such as H263, MPEG2 and MPEG4 (standing for "Moving Picture Experts Group") or AVC (standing for "Advanced Video Coding"), are of growing complexity and that the first implementations of associated coders are "off-line". Moreover, even after several years and despite the ever growing power of computers, "off-line" coders still remain substantially better than "real time" coders. The simulcast and hierarchization techniques are therefore particularly beneficial for taking efficient account of the bandwidth availability.

However, they have the drawback, in their generic form, of violating the AIMD principle of progressive increase of throughput. Specifically, the disparity between two simulcast streams or corresponding to the addition of a hierarchization layer produces throughput augmentation tiers, during bandwidth availability phases. These disparities are the larger when the number of streams envisaged (encoding according to several throughputs or with enhancement layers) is relatively restricted. Specifically, in practice, the sequences are encoded only a reduced number of times, or only a reduced number of layers is envisaged, in the interests of saving memory space and processing, and for simplicity of management and of implementation.

Moreover, in case of congestion (loss of packets), the switching from one stream to another of lesser throughput requires specific processing operations on the part of the server. During this time, the customer receives a degraded stream.

Certain other "off-line" stream procedures make it possible to assuage these problems. Thus, the technique of fine hierarchization or FGS (standing for "Fine Grain Scalability") allows real-time adjustment of the throughput of the stream sent by truncating the upper enhancement layer. However, this technique turns out to offer a rather reduced effectiveness of coding as compared with the generic techniques of selective transmission.

The technique of sub-band coding also relies on a truncation of an enhancement layer and turns out to be rather efficient. However, it involves a level of complexity greater than that required for the coding algorithms customarily used (based on DCT procedures, standing for "Discrete Cosinus Transforms").

In order to remedy the problems of throughput jumps of the simulcast and hierarchization techniques, a person skilled in the art could be tempted to multiply up the number of streams envisaged (that is to say of versions of different throughputs in the simulcast technique or of layers in the hierarchization technique). Thus, the disparities in throughput between two successive entities could be reduced accordingly. However, such a solution turns out to be very expensive in terms of necessary storage and in terms of stream management, all the more so as it makes it possible to get nearer to the AIMD principle of progressive increase of throughput.

3. SUMMARY OF THE INVENTION

The present invention relates to a data preparation device that may be able to provide a data stream complying with the AIMD principle of progressive growth of throughput, while being capable of being efficient in terms of coding, of not significantly increasing complexity and of avoiding a significant increase in the management and storage costs. The device of the invention can even be TCP-friendly. Morever, it may be capable of reacting very quickly to packet losses.

The invention also relates to a data preparation method and to a computer program corresponding to the device of the invention, having the abovementioned advantages, as well as to a data server comprising a device in accordance with the invention.

It applies in particular to the field of the streaming of audiovisual streams over IP network.

To this end, the subject of the invention is a device for the preparation of data to be sent in a continuous stream to at least one receiver via a communication network. This device comprises:

means of obtainment of the data originating from a database, this database containing at least two data stream entities for data associated respectively with different transmission throughputs, means of transfer of these data obtained to a system for sending the data as a continuous stream over the network, means of connection of the means of obtainment to one of the stream entities of the database, and means of switching of the means of connection from one of the entities to another of the entities.

According to the invention:

the preparation device comprises means of regular addition to the data transferred to the sending system, of error correction codes so as to form an augmented data stream, the means of switching are designed to switch the means of connection from a first of the entities, associated with a first sending throughput, to a second of the entities, associated with a second sending throughput greater than the first sending throughput, when the stream of the data transferred augmented with the added error correction codes reaches a threshold throughput equal to the sum of the second sending throughput and of an additional throughput (which may be reduced to zero) associated with an initial input of error correction code for the second entity, and the means of addition are designed to reinitialize the addition of the codes to this initial input upon the switching of the first entity to the second entity.

The expression "sending as a continuous stream", or "streaming", is understood to mean sending data which allow receivers to read them in real time during transmission, without having to wait for them to be completely downloaded.

The term "regular" relating to the addition of the error correction codes implies gradual and progressive additions over time, preferably periodic.

"Reaching" the threshold throughput is understood to mean becoming equal to or greater than it.

The device of the invention thus relies on a progressive increase of throughput for each stream entity, until a nominal value is reached which corresponds to an entity of higher throughput, possibly augmented by an additional value corresponding to precautionary (as regards risks of congestion) error correction codes. A switchover to the latter entity may then be triggered without any jump in throughput, or with a significantly reduced jump. It is thus possible to utilize the existing and proven simulcast or hierarchization procedures, while complying with the AIMD principle of progressive growth of throughput.

However, in contradistinction to the solution that the person skilled in the art mentioned above would be tempted to implement in order to achieve such a realization, that is to say padding, the device of the invention utilizes error correction codes. The intervention (unexpected in such a use) of these codes is particularly advantageous in case of data losses. Specifically, they then make it possible to automatically correct these losses (at least partially).

Thus, not only may the device of the invention be suitable for complying the AIMD principle, both as regards progressive growth of throughput and its abrupt decrease (through total or partial elimination of the error correction codes added), but it may also avoid impairments at reception level—by compensating for packet losses.

The possible initial input of error correction codes for the second data stream entity is determined on the basis of this second entity, preferably in real time during sending. It makes it possible to take account of the risks of congestion right from the first instants following the switch to the second entity and/or to correct a level of residual losses. In a variant, the error correction codes are determined beforehand, and stored with the second stream entity.

The quantity of this input (giving the additional throughput level) is advantageously fixed dynamically as a function of the estimated current state of the network (risk of congestion). In the case where the error correction codes associated with the second entity are recorded beforehand with this entity, provision is then made to dynamically adjust the quantity of these codes which is utilized for the switching. The entities are thus provided with predetermined levels for placing a ceiling on the error correction codes, which may be utilized fully or partially during switchings. In a variant embodiment, the additional throughput level is predefined, and may be identical for all the entities.

The quantity of the initial input of error correction codes advantageously represents between 1% and 3% of additional throughput, compared with the nominal throughput of the second stream entity.

According to a particular embodiment, the initial input of error correction codes is zero. The means of switching are then designed to switch the means of connection when the stream of the data transferred augmented by the added error correction codes reaches the second sending throughput, and the means of addition are designed to reinitialize to zero the addition of the codes upon switching.

Preferably, the device comprises means of automatic throughput regulation capable of reducing the quantity of the codes added upon detection of risk of congestion. These means are then advantageously designed to reinitialize to zero the addition of these codes upon detection of this type.

It is thus easily possible to achieve a TCP-friendly behaviour, while guaranteeing customers optimal quality. The detection of a risk of congestion may in particular consist of a noting of packet losses, of a rise in the RTT and/or of a value of throughput received that is lower than the value of the throughput dispatched, or else be obtained by means of a quality of service application, or "QoS" (standing for "Quality of Service") in the case of a network into which a QoS management system is integrated. It is advantageous not to subsequently restart the addition of error correction codes until after a predefined duration—for example between one second and 30 seconds.

Advantageously, means of connection are designed to select one of the entities as a function of a throughput preset modifiable over time and the means of addition are designed to be activated when the selected entity is associated with a sending throughput greater than the sending throughput of another of the entities that is currently sending. This embodiment applies in particular in respect of the simulcast and hierarchization techniques.

According to a particular embodiment (hierarchization technique), the means of obtainment are capable of obtaining at least one of the entities by superimposing on another of the entities at least one data stream layer available in the database.

Preferably, the means of addition are designed such that each increment of the codes added to the data transferred causes an increase in the sending throughput of the augmented data stream which is less than a third of the difference between the second sending throughput and the first sending throughput respectively associated with the second entity and with the first entity. Jumps in throughput on passing between successive entities are thus reduced by at least a factor of three.

According to an advantageous embodiment, the means of switching are capable of switching the means of connection of one of the entities currently sending, associated with a nominal current sending throughput to another of the entities, associated with a nominal fallback sending throughput that is lower than the current nominal throughput, upon detection of risk of congestion.

In case of risk of congestion, there is then preferably a switchover from the entity currently sending to the other entity of lower nominal throughput, while adding to the latter stream entity an initial input of error correction codes that is able to compensate for the loss rate estimated at the moment of the switchover. Moreover, matters are advantageously devised in such a way that the total throughput obtained after switchover (fallback entity with error correction codes) is much lower than the throughput previously used (current entity with error correction codes). The constraint of multiplicative decrease according to the AIMD principle is thus complied with while also reducing the risks of data loss.

The invention also pertains to a server of data, preferably of video data, characterized in that it comprises a data preparation device in accordance with any one of the embodiments of the invention.

This server is advantageously designed to send data over an IP network, in accordance with the RTP and UDP protocols utilized jointly.

A subject of the invention is also a method for the preparation of data to be sent in a continuous stream to at least one receiver via a communication network, according to which:

these data originating from a database are obtained, this database containing at least two data stream entities for data associated respectively with different transmission throughputs, by extracting the data from one of the stream entities, the obtained data are transferred to a system sending this data as a continuous stream over the network, and there is a switch from one of the entities to another of the entities to obtain these data.

According to the invention:

error correction codes are added regularly to the data transferred to the sending system, so as to form an augmented data stream, there is a switch from a first of the entities, associated with a first sending throughput, to a second of the entities, associated with a second sending throughput greater than the first sending throughput, when the stream of the data transferred augmented with the added error correction codes reaches a threshold throughput equal to the sum of the second sending throughput and of an additional throughput (which may be reduced to zero) associated with an initial input of error correction codes for the second entity, and the addition of these codes to this initial input is reinitialized when switching from the first entity to the second entity.

The invention applies also to a computer program product comprising program code instructions for the execution of the steps of the method according to the invention, when this program is executed on a computer. The expression "computer program product" is understood to mean a computer program medium, which may consist not only of a storage space containing the program, such as a diskette or a cassette, but also of a signal, such as an electrical or optical signal.

4. LIST OF DRAWINGS

Figure 2:
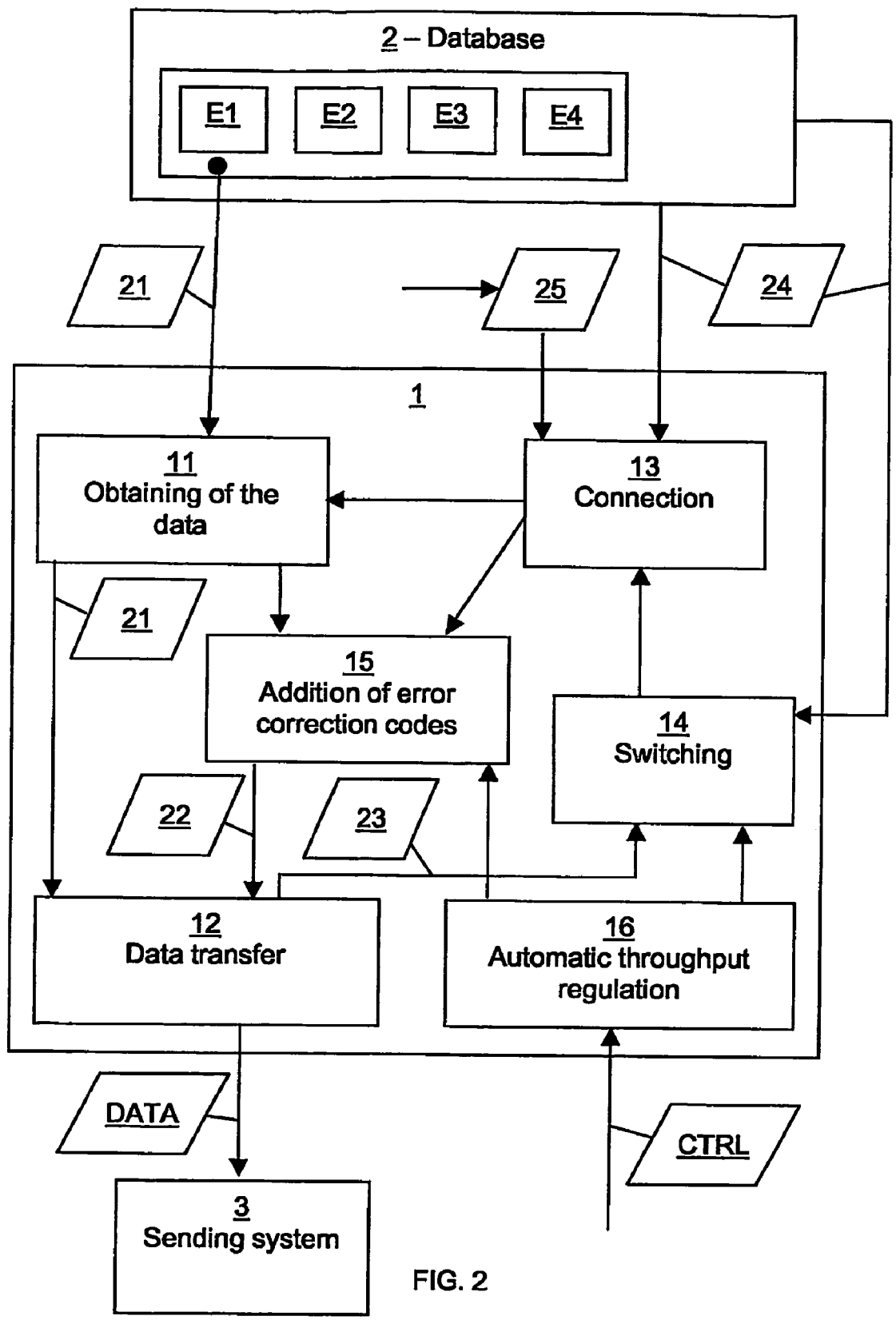
Figure 3:
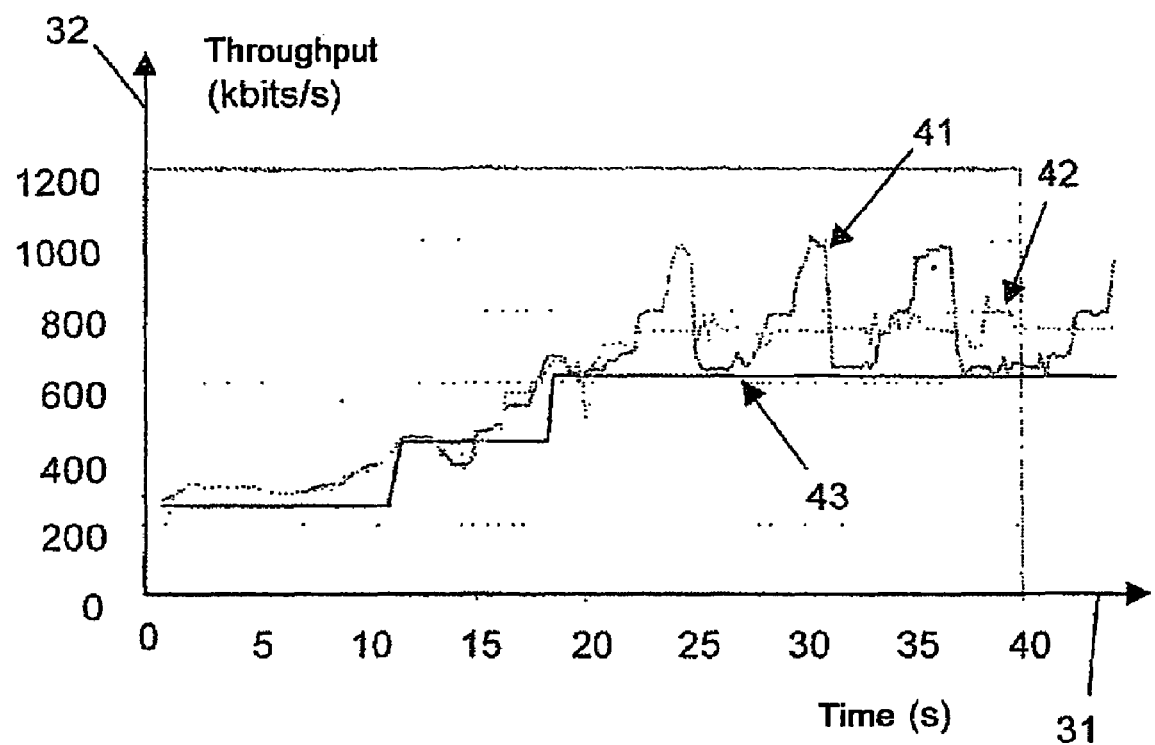
Figure 4:
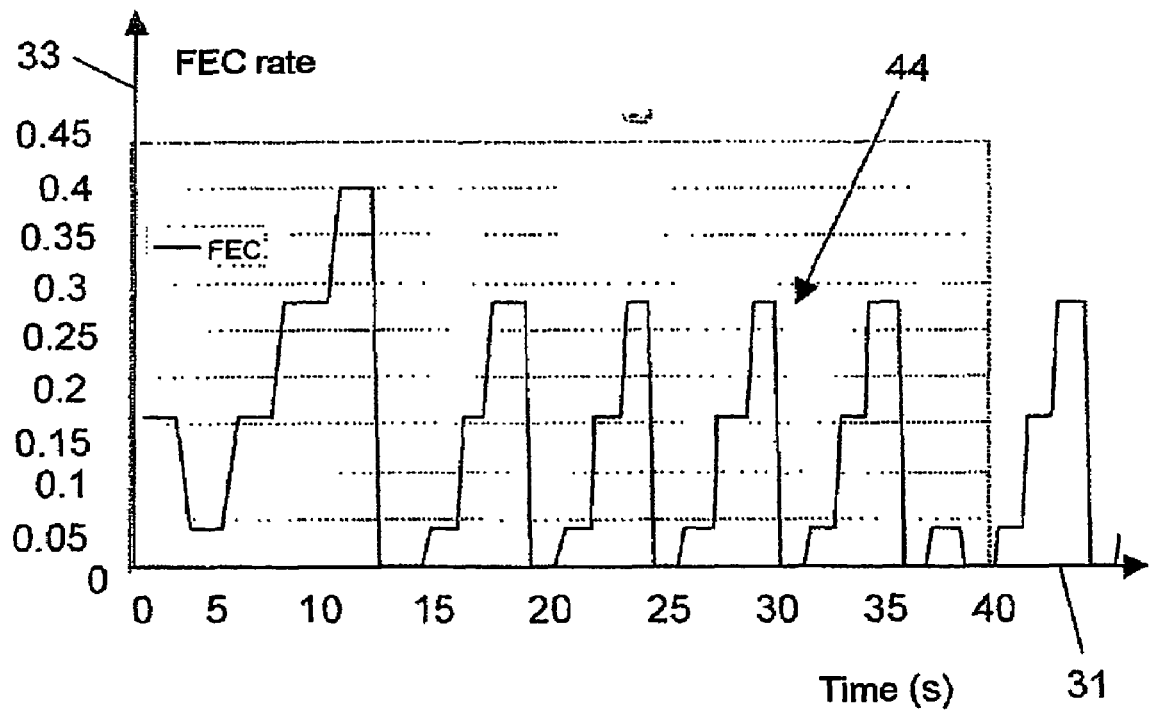

The invention will be better understood and illustrated by means of the following exemplary embodiments and modes of implementation, that are wholly nonlimiting, with reference to the appended drawings in which:

FIG. 1 is a basic diagram of a sending-receiving set including a data server, which comprises a data preparation device in accordance with the invention, receivers, and a network for communication between the server and the receivers;

FIG. 2 details the data preparation device of FIG. 1, in the form of functional blocks;

FIG. 3 represents in a particular application of video streaming over IP network by simulcast transmission, implementing the invention by progressive addition of FEC codes, the time dependence (time expressed in seconds) of the throughputs (in kbits/s) sent by the server of FIG. 1 and received by one of the receivers of FIG. 1, as well as of the simulcast nominal throughput corresponding to the successively transmitted stream entities;

and FIG. 4 represents the variation as a function of time (expressed in seconds) of the rate of FEC codes in the stream sent by the server of FIG. 1, for the application represented in FIG. 3.

5. DETAILED DESCRIPTION OF THE INVENTION

In FIGS. 1 and 2, the modules represented are functional units, which may or may not correspond to physically distinguishable units. For example, these modules or some of them may be grouped together into a single component, or constitute functionalities of one and the same software. Conversely, certain modules may possibly be composed of separate physical entities.

A data server 10 (FIG. 1) comprises a database 2, a device 1 for the preparation of data to be sent by the server 10 in the form of data DATA supplemented and formatted for transmission after extraction thereof from the database 2, and a system 3 for sending these extracted data to receivers R1, R2 . . . Rn via a communication network 5.

The server 10 is also able to utilize control information CTRL received from the network 5, in particular on the basis of signals sent back by the receivers Ri.

More precisely (FIG. 2), the database 2 contains data stream entities Ej (j=1-4 in the example illustrated), these entities Ej being associated with distinct transmission throughputs and being ranked in ascending order of throughput.

The data preparation device 1 comprises (FIG. 2):
a module 11 for obtaining the data 21 originating from the database 2;
a module 12 for transferring these data 21 supplemented and formatted in the form of data DATA, to the sending system 3;
a module 13 for connecting the obtaining module 11 to one of the stream entities Ej of the database 2 (the entity E1 in the illustration of FIG. 2);
a module 14 for switching the module for connection 13, from one of the entities to another; for example, the switching module 14 is able to toggle the connection of the module 13 from the current entity (E1) to the next entity having an immediately higher throughput (E2);
a module for the regular addition 15 to the data 21 retrieved by the transfer module 12, of FEC codes referenced 22; the data DATA transmitted thus integrate both the data 21 extracted from the database 2 and the codes 22;
and an automatic throughput regulation module 16 able to utilize the control information CTRL so as to act on the one hand on the module 15 for adding the FEC codes and on the other hand on the switching module 14; more precisely, the regulation module 16 is able to instruct the addition module 15 to reinitialize to zero (or to a minimum value) the FEC codes upon detection of risk of congestion; in a variant embodiment, the regulation module 16 causes only a significant decrease in the quantity of codes 22 provided by the addition module 15, for example a division by two; the regulation module 16 is also able to instruct the switching module 14 to connect the module 13, from the current entity to an entity having a lower throughput in case of detection of congestion, or of risk of congestion.

The switching module 14 is designed to operate in the following manner. It employs nominal sending throughputs 24 associated with the entities Ej of the database 2, and receives from the transfer module 12 the actual sending throughput 23 of the data DATA. The actual sending throughput 23 is initially that of the stream entity Ej currently transmitting (for example E1) and is lower than that of the next entity E(j+1) (here, E2). It grows along with the addition of the FEC codes. The switching module 14 then regularly compares the two throughputs 23 and 24, and when the actual throughput 23 reaches the nominal throughput associated with the next entity (Ej+1), it triggers a switch of the connection module 13 to the latter entity.

Moreover, the connection module 13 is designed to receive a throughput preset 25 modifiable over time, which depends on the availability of bandwidth for transmission to the network 5. The connection module 13 then selects one of the entities Ej as a function of this preset 25, by choosing the entity Ej having a nominal throughput immediately lower than the value of this preset 25. However, this selection does not equal connection to the chosen entity, but conditions the activation of the codes addition module 15, when the entity selected is associated with a nominal sending throughput that is greater than the nominal throughput of the entity currently transmitting.

For example, the entity currently transmitting is E1 and the throughput preset 25 lies between the nominal throughputs 24 associated respectively with the stream entities E3 and E4. In this case, the entity selected by the connection module is E3, and the addition of the FEC codes is triggered in the addition module 15.

This functionality makes it possible to enhance the transitions from one stream entity Ej to another, while avoiding needless triggering of the addition of codes 22.

In a first embodiment, the entities Ej correspond to simulcast streams.

In a second embodiment, they correspond to streams obtained by hierarchization, by superimposing successive layers. In this case, the entity E1 corresponds to the base layer, and the entities E2 to E4 respectively comprise 1 to 3 additional enhancement layers. In practice, the streams are then not preformed in the database 2, but constructed during the extraction of the data 21, by superimposing the appropriate layers.

Results of tests performed by simulation demonstrate the benefit and efficiency of the preparation device 1 described above. According to these tests, regulation is carried out for multimedia audio and/or video streams, by streaming over IP network (the network 5). The simulcast transmission procedure is combined with progressive addition of FEC codes (addition module 15), in this instance in the form of Reed-Solomon codes, by following the AIMD recommendations in respect of the incrementation of the sending throughput. For the tests, four simulcast streams are chosen (entities E1-E4) coded respectively at the throughputs 256, 415, 615, 800 kbit/s, and a bandwidth limited to 760 kbit/s.

A variation as a function of time (axis 31) of the data transmission throughput (axis 32) for the stream sent by the server 10 (curve 41), the stream received by one of the receivers Ri (curve 42) and the nominal value for the stream entity currently transmitting (curve 43) are thus obtained (FIG. 3). The dependency on time (axis 31) of the rate of FEC codes added (axis 33) is also available (FIG. 4, curve 44).

Thus, starting from the first stream entity (256 kbit/s), the FEC code rate is progressively raised as long as no loss is detected (between 0 and around 11.5 s), then we switch over to the second stream entity (415 kbit/s). The same is done to go from the second to the third entity (615 kbit/s, between around 11.5 and 19 s).

We then continue to raise the FEC rate regularly, but as soon as a risk of congestion is detected, the addition of the FEC codes is reinitialized to zero. This detection is obtained by noting a rise in the parameter RTT and a sending throughput greater than the throughput received (this corresponding to a filling of the FIFO memories of the routers presaging the appearance of congestion). These reinitialization operations are performed in the vicinity of 24, 28 and 36 s: all attempts at raising throughput are abortive since the available bandwidth (760 kbit/s) is lower than the throughput of the fourth stream (800 kbits). The process for adding FEC codes is at each interruption resumed subsequently one second later (hence in the vicinity of 25, 29 and 37 s).

As is apparent, the throughput rises progressively, in a much gentler manner than if one were to go directly from one stream entity to another. Moreover, even if losses appear at round about the instants 24, 28 and 35 s, the FEC code rate at that moment is such that they are corrected automatically.

The invention claimed is:

1. A device for preparation of data to be sent in a continuous stream to at least one receiver via a communication network, said device comprising: memory; means of obtainment of said data originating from a database, said database containing at least two data stream entities for data associated respectively with different transmission throughputs; means of transfer of said obtained data to a system for sending said data as a continuous stream over said network; means of connection of said means of obtainment to one of said data stream entities of the database; and means of switching of the means of connection from one of said data stream entities to another of said data stream entities; wherein: said device comprises means of regular increment addition to said data transferred to the system, of error correction codes to form an augmented data stream; said means of switching being designed to switch the means of connection from a first of said data stream entities, associated, with a first sending throughput, to a second of said data stream entities, associated with a second sending throughput greater than said first sending throughput, when the stream of said data transferred augmented with said added error correction codes reaches a threshold throughput equal to the sum of the second sending throughput and of an additional throughput associated with an initial input of error correction codes for said second data stream entity; and said means of addition being designed to reinitialize the addition of said error correction codes to said initial input upon the switching of said first data stream entity to said second data stream entity.

2. The preparation device according to claim 1, wherein said preparation device comprises means of automatic throughput regulation capable of reducing the quantity of said error correction codes added upon detection of risk of congestion.

3. The preparation device according to claim 2, wherein said means of automatic throughput regulation are designed to reinitialize to zero the addition of said error correction codes upon detection of risk of congestion.

4. The preparation device according to claim 1, wherein said means of connection are designed to select one of said data stream entities as a function of a throughput preset modifiable over time and said means of regular increment addition are designed to be activated when said selected one of said data stream entities is associated with a sending throughput greater than the sending throughput of another of said data stream entities currently being sent.

5. The preparation device according to claim 1, wherein said means of obtainment are capable of obtaining at least one of said data stream entities by superimposing on another of said data stream entities at least one data stream layer available in the database.

6. The preparation device according to claim 1, wherein said means of addition are designed for each increment of said error correction codes added to the transferred data to cause an increase in the sending throughput of said augmented data stream which is less than a third of the difference between the second sending throughput and the first sending throughput respectively associated with the second entity and with the first entity.

7. The preparation device according to claim 1, wherein said means of switching are capable of switching the means of connection of one of the data stream entities currently sending, associated with a nominal current sending throughput to another of the data stream entities, associated with a nominal fallback sending throughput lower than the current nominal throughput, upon detection of risk of congestion.

8. A server, wherein said server comprises a data preparation device to for preparation of data to be sent in a continuous stream to at least one receiver via a communication network, said data preparation device comprising: memory; means of obtainment of said data originating from a database, said database containing at least two data stream entities for data associated respectively with different transmission throughputs; means of transfer of said obtained data to a system for sending said data as a continuous stream over said network; means of connection of said means of obtainment to one of said data stream entities of the database; means of switching of the means of connection from one of said data stream entities to another of said data stream entities; means of regular increment addition to said data transferred to the system, of error correction codes to form an augmented data stream; said means of switching being designed to switch the means of connection from a first of said data stream entities, associated, with a first sending throughput, to a second of said data stream entities, associated with a second sending throughput greater than said first sending throughput, when the stream of said data transferred augmented with said added error correction codes reaches a threshold throughput equal to the sum of the second sending throughput and of an additional throughput associated with an initial input of error correction codes for said second data stream entity; and said means of addition being designed to reinitialize the addition of said error correction codes to said initial input upon the switching of said first data stream entity to said second data stream entity.

9. The server according to claim 8, wherein said server is designed to send data over an IP network, in accordance with the RTP and UDP protocols utilized jointly.

10. The server according to claim 8, wherein said server is a server of video data.

11. A method for preparation of data to be sent in a continuous stream to at least one receiver via a communication network comprising the steps of: obtaining said data originating from a database, said database containing at least two data stream entities for data associated respectively with different transmission throughputs, by extracting said data from one of said data stream entities; transferring said obtained data to a system sending said data as a continuous stream over said network; switching from one of said data stream entities to another of said data stream entities to obtain said data; adding error correction codes of regular increments to said data transferred to the system, to form an augmented data stream; switching from a first of said data stream entities, associated, with a first sending throughput, to a second of said data stream entities, associated with a second sending throughput greater than said first sending throughput, when the stream of said data transferred augmented with said added error correction codes reaches a threshold throughput equal to the sum of the second sending throughput and of an additional throughput associated with an initial input of error correction codes for said second data stream entity; and reinitializing the addition of said error correction codes to said initial input when switching from said first data stream entity to said second data stream entity.

* * * * *